Nov. 4, 1941.  H. G. POND  2,261,282
BEAN AND PEA HARVESTER
Filed April 9, 1940  2 Sheets-Sheet 1
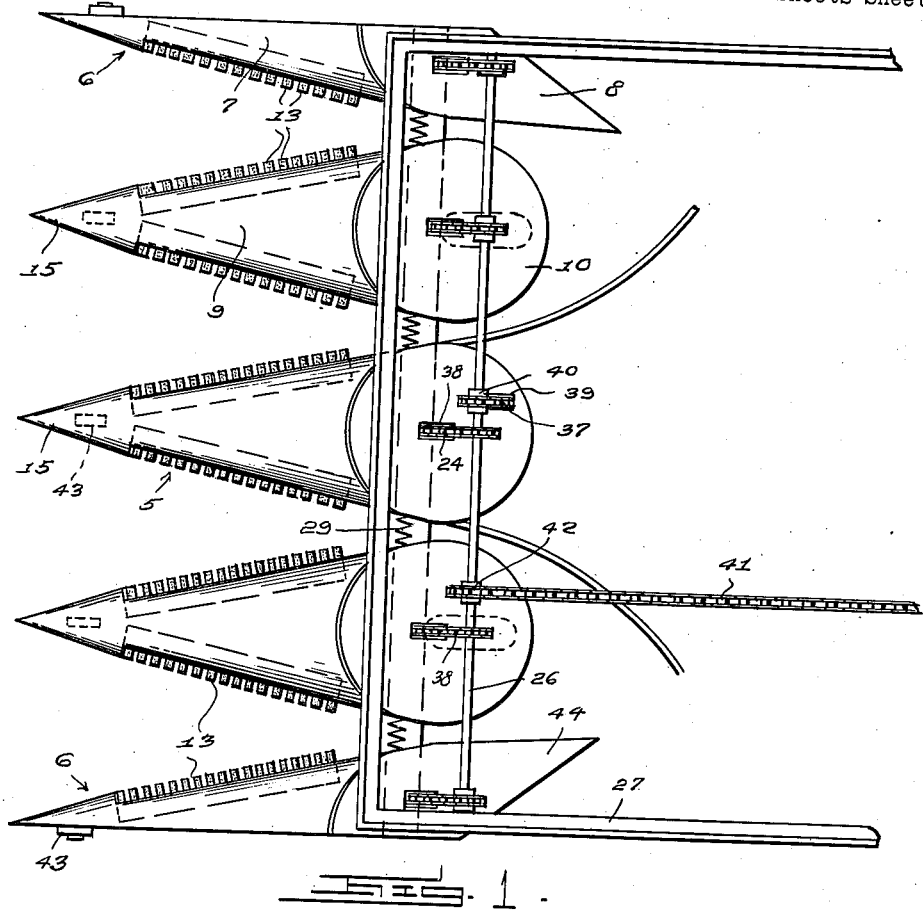
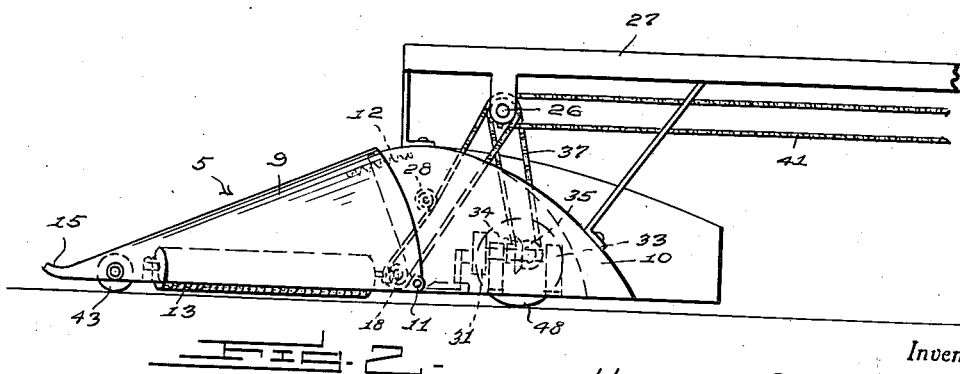
Inventor
HAROLD G. POND,
By *Clarence A. O'Brien*
Attorney

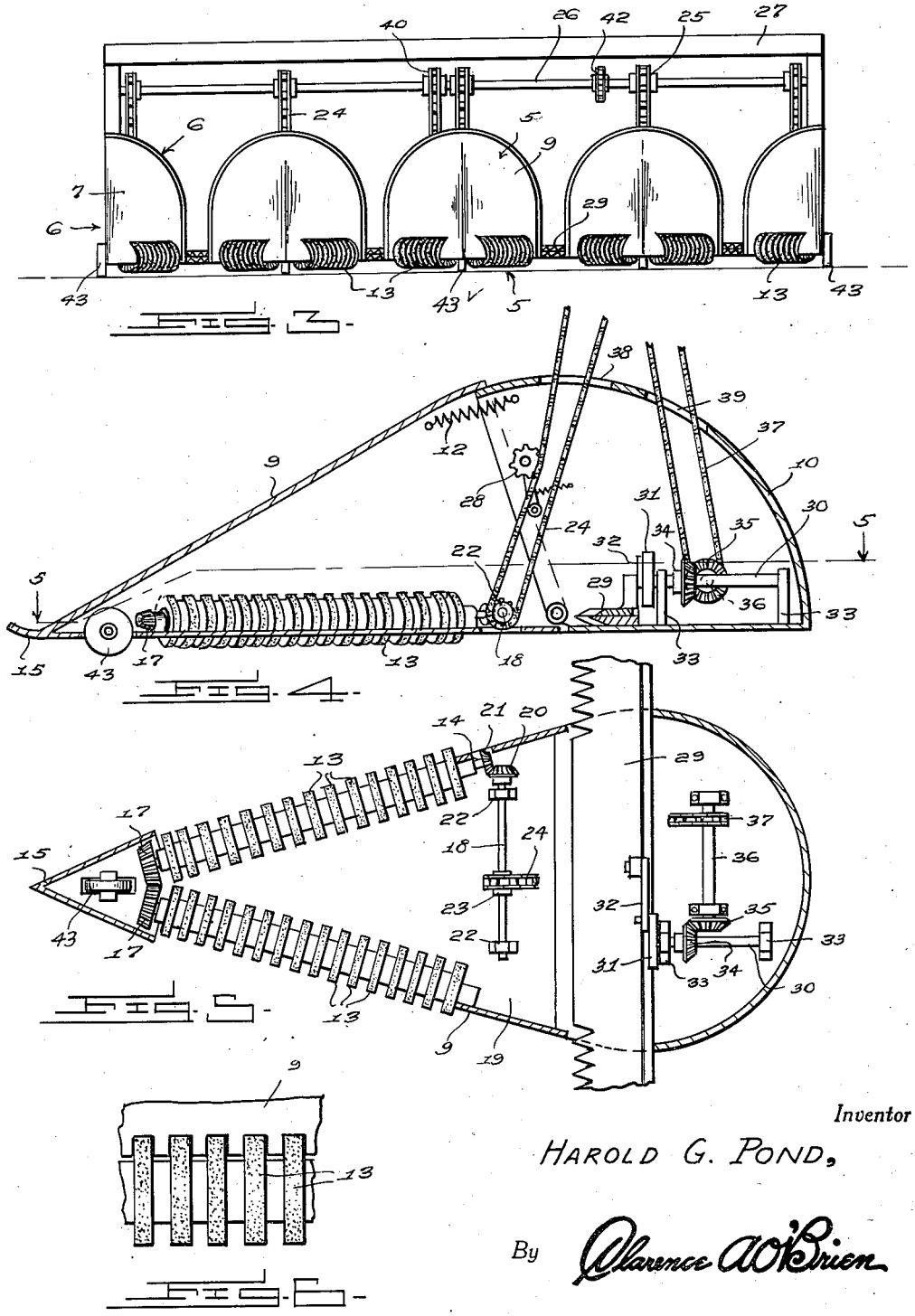

Patented Nov. 4, 1941

2,261,282

UNITED STATES PATENT OFFICE 2,261,282

BEAN AND PEA HARVESTER

Harold G. Pond, Powell, Wyo.

Application April 9, 1940, Serial No. 328,749

2 Claims. (Cl. 56—317)

This invention appertains to new and useful improvements in harvesting machines, especially adapted for harvesting beans, peas, and other crops of the row drilled variety.

The principal object of the present invention is to provide means for lifting and dividing foliage of crops to be harvested and directing the same to the sickle in such a manner as to eliminate as much as possible dirt and other debris from entering the threshing and milling processes.

Another important object of the invention is to provide a machine of the character stated which is of simple construction, positive acting and not susceptible to the ready development of defects.

Other objects and advantages of the invention will become apparent to the reader of the following specification.

In the drawings:

Figure 1 represents a fragmentary top plan view.

Figure 2 is a fragmentary end elevational view.

Figure 3 is a front elevational view.

Figure 4 is an enlarged detailed sectional view through one of the dividers.

Figure 5 is a horizontal sectional view taken substantially on the line 5—5 of Figure 4.

Figure 6 is an enlarged detailed fragmentary sectional view showing the rollers.

Referring to the drawings wherein like numerals designate like parts, it can be seen that the apparatus is divided into units generally referred to by numeral 5. These units being more specifically identified as inner or intermediate units, while the end units 6 are only different in construction in that the forward sections and rearward sections 7 and 8, respectively, are only the half size of the sections 9 and 10 of the units 5.

More specifically, the units 5 each consists of a semi-conical-shaped nose shell section 9 and a substantially turtle shell-shaped structure 10. The bottom of each of the shells 9 and 10 is open and the rear end of the shell 9 is open to receive the forward end portion of the corresponding structure 10. The lower corner portions of the shell 9 and structure 10 are pivotally secured together as at 11, while the upper portions are held in proper interlapped relation by a tension spring 12.

The lower edge portion of each side wall of the section 9 is cut away to afford clearance for the row of rollers 13. As suggested in Figure 5, each row of rollers 13 is mounted on a corresponding shaft 14 and these shafts converge toward each other to terminate in a pointed and upturned forward end portion 15 of the nose shell 9. Furthermore, at this forward end the adjacent shafts 14 are provided with beveled gears 17 which mesh, to the end that one shaft will drive the other.

A transversely disposed shaft 18 is mounted upon the bottom 19 of the shell 9 and has a beveled gear 20 at one end meshing with the beveled gear 21 on the adjacent end of the corresponding shaft 14. The shaft 18 is disposed through suitable bearings 22 and has a sprocket wheel 23 thereon over which is disposed the drive chain 24 which extends downwardly from a corresponding drive sprocket 25 on the drive shaft 26, the latter being supported at its ends in the machine frame 27.

It is to be understood that the lower portion of the nose shell 9 is to be cut out to allow protrusion of the rollers 13 and that these rollers are preferably constructed of tufts of fibre and rotate in the manner to lift foliage upwardly and on to the nose shell 9.

A spring affected tensioning sprocket 28 is provided for the chain 24.

A sickle bar 29 extends transversely of the machine and through the turtle back structures 10.

In one of the turtle back structures 10 a shaft 30 is mounted and has an eccentric wheel 31 in one end to which the connecting rod 32 from the sickle bar 29 is eccentrically connected. This shaft 30 is disposed through bearings 33 and has a beveled gear 34 thereon meshing with a beveled gear 35 located on the shaft 36 on which is a sprocket wheel under which the sprocket chain 37 is trained.

As shown in Figure 4, the sprocket chains 24 and 37 extend upwardly through the turtle shell structure 10 by way of openings 38 and 39, the chain 37 extending to the sprocket 40 on the shaft 26. A drive chain 41 extends from a suitable power source to the sprocket wheel 42 on the shaft 26.

The end units 6 have wheels 43 and inwardly tapered tail portions 44.

It can now be seen, that as the dividers 5 and 6 divide the bushes, the rollers 13 on the units 5 and 6 catch the foliage, lifted from the ground and onto the dividers and as the machine approaches, the sickle 29 sets the stem of the bushes without cutting through the foliage thereof.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In a harvesting machine, a pair of forwarding projecting crop dividers having opposed side walls, said dividers being of hollow construction and having said opposed side walls longitudinally slotted, a lifting unit mounted in each of the hollow dividers adjacent the slot of its slotted side, each of the lifting units having portions thereof operating through the slot of the adjacent slotted side to catch and lift material.

2. In a harvesting machine, a pair of forwarding projecting crop dividers having opposed side walls, said dividers being of hollow construction and having said opposed side walls longitudinally slotted, a lifting unit mounted in each of the hollow dividers adjacent the slot of its slotted side, each of the lifting units having portions thereof operating through the slot of the adjacent slotted side to catch and lift material, each of said lifting units including a plurality of individual tuft rollers, the opposed side walls of the dividers being notched at the edge portions of the slots to permit snug passage of the individual tuft rollers.

HAROLD G. POND.